Patented Oct. 2, 1923.

1,469,466

UNITED STATES PATENT OFFICE.

ISIDORE FRANÇOIS VERMEIRE, OF BRUSSELS, BELGIUM.

PRODUCTION OF CREOSOTE MIXTURE FOR IMPREGNATING WOOD.

No Drawing.　　Application filed December 12, 1922.　Serial No. 606,542.

*To all whom it may concern:*

Be it known that I, ISIDORE FRANÇOIS VERMEIRE, subject of the King of Belgium, residing at Brussels, 22 Rue des Fabriques, have invented certain new and useful Improvements Relating to the Production of Creosote Mixture for Impregnating Wood, of which the following is a specification.

The present invention relates to a process by means of which the oil of creosote may be prepared and purified in such a manner as to be capable of being used directly for the impregnation of wood at ordinary pressure, that is to say without being passed through apparatus which has been used hitherto, wherein the wood was subjected either to a vacuum and to injection under pressure, or to an injection under pressure subsequent to a vacuum adapted to eliminate the excess of creosote.

Experience has shown that when the oils of creosote are subjected to agitation in the presence of small quantities of bodies such as phenols, with which may be mixed other bodies such as tar, the light oils of tar and benzol, the mixture being agitated and then filtered, oils of creosote are obtained which effectively penetrate the pores of the wood which it is desired to impregnate.

The details of the process, forming the subject of the invention, will be seen clearly from the example given below:—

Example.

The mixture is made as follows:—

| | Parts. |
|---|---|
| Creosote | 70.0 |
| Phenol (commercial) at 32% | 6.0 |
| Coal tar | 9.5 |
| Light oil of coal | 8.0 |
| Benzol | 6.5 |
| | 100.0 |

This mixture is treated in a trough, provided with suitable devices, for about two hours.

During this treatment, the ammonia contained as an impurity in the coal tar is completely eliminated. The larger portion of the impurities, among others the paraffins, contained in the mixture which is formed, are allowed to settle.

The mixture is then decanted on a filter which is preferably formed by a column composed of a number of layers of broken or pulverized coke.

The creosote thus obtained has a density of between 1060 and 1100.

For impregnating wood it suffices to soak the wood for a time and the liquid may be contained in an open trough or tank at atmospheric pressure.

In certain cases the creosote may be heated to about 100° C., but it is also possible to carry out the process at the ordinary temperature.

Claims:

1. A method of preparing oils of creosote for the impregnation of wood, comprising, mixing oils of creosote with a small proportion of phenols and hydrocarbons, subjecting the mixture thus obtained to agitation, and then filtering the mixture.

2. A method according to claim 1, said hydrocarbons being coal tar, light oil of tar, and benzol.

3. A method according to claim 1, filtering being effected by means of coke.

4. A method according to claim 2, filtering being effected by means of coke.

5. A method according to claim 3, the impregnation being effected at ordinary atmospheric temperature.

6. A method according to claim 4, the impregnation being effected at ordinary atmospheric temperature.

7. A method according to claim 5, the impregnation being effected at temperatures as high as 100° C.

8. A method according to claim 6, the impregnation being effected at temperatures as high as 100° C.

9. The product obtained by mixing approximately 70 parts of creosote with, approximately, 6 parts of commercial phenol at 32%, 9.5 parts of tar, 8 parts of light tar oil and 6.5 parts of benzol, subjecting this mixture to agitation, and then filtering it through coke, substantially as described.

10. A product containing approximately 70 parts of creosote, and, approximately, 6 parts of commercial phenol at 32%, 9.5 parts of tar, 8 parts of light tar oil, and 6.5 parts of benzol.

11. A product composed approximately ⅔ by weight, of creosote, and approximately ⅓ by weight, of a mixture of phenols and hydrocarbons.

In testimony whereof I have signed my name to this specification.

ISIDORE FRANÇOIS VERMEIRE.

Witnesses:
  LEONARD LEVA,
  MARIE DEFRENNE.